Patented May 24, 1949

2,471,102

UNITED STATES PATENT OFFICE 2,471,102

TREATMENT OF MICROCRYSTALLINE RESIDUES AND PRODUCTS RESULTING THEREFROM

John J. Fish, New York, N. Y., assignor to Sun Chemical Corporation, New York, N. Y., a corporation of Delaware No Drawing. Application December 4, 1945, Serial No. 632,785

15 Claims. (Cl. 196—78)

The present invention relates to improvement of microcrystalline residues, and it particularly relates to enhancement of such residues derived from crude petroleum.

According to the present invention, the preferred material to be processed is derived from Texas crude petroleums and, less preferably, from Kansas crude petroleums. Naphthenic base petroleums such as those derived from California fields and those derived from sources in Russia, Venezuela, Iraq, Persia and East Indies are least preferred.

The most desired starting materials are derived by settling the crude petroleums or by separating fractions thereof so that the relatively non-volatile high melting point microcrystalline residues therein will be separated.

It is among the objects of the present invention to improve the characteristics of the microcrystalline residues so that they may be readily combined with other components and used in inks, crayon, coating compositions and in plastic compounds in general.

A further object is to improve microcrystalline residues so that they will have improved characteristics in respect to hardness, penetration, setting, non-tackiness, and less contraction when dry, and in mixture with oils and solvents.

Other objects will be apparent or will appear during the course of the following specification.

According to one preferred procedure, the microcrystalline residue is first treated with an aluminum halide and also if desired in the presence of a hydrogen halide gas.

Following this treatment, the molten microcrystalline residue may be filtered to receive sludge, floating material and any residual aluminum chloride and vacuum distilled.

The microcrystalline residue should be maintained in molten condition during this treatment and the desired treating temperature and duration is between 90° C. to 180° C. for 4–25 hours.

The desired starting material, crude microcrystalline residue, is preferably obtained by settling from crude petroleum or various petroleum residues or fractions or products. Tank bottoms of Texas and Kansas petroleums are quite satisfactory.

These crude microcrystalline residues may be further treated before processing by solvent extraction and/or by distillation with or without a vacuum and with or without steam.

By settling microcrystalline residues alone without solvent extraction, followed by vacuum distillation (with or without steam) at temperatures ranging up to below the cracking point, there is still left about 4% to 20% of non-volatile liquid or semi-liquid hydrocarbons in the microcrystalline residue.

This liquid or semi-liquid hydrocarbon cannot be separated by sweating or other physical procedures and can only be separated by solvent extraction followed by filtration or centrifuging and washing with solvent such as methyl ethyl ketone, acetone, propane and benzene or mixtures thereof.

By treating this microcrystalline residue with anhydrous AlCl₃ with or without a dry hydrogen chloride atmosphere at 90° C. to 110° C. for about 7 hours, a black sludge will form which is not soluble in the residue or in aliphatic hydrocarbon solvents but which is soluble in benzene, toluene and aromatic solvents and asphalt.

If desired, hydrogen fluoride may be substituted for hydrogen chloride and aluminum fluoride may be used in lieu of aluminum chloride. Higher pressures than atmospheric may be used.

The sludge is a very hard brittle mass when cold and it has a high melting point of 110° C. to 122° C. and it is thermosetting since when overheated it becomes very viscous and does not melt.

To give a specific example, solvent extracted Texas crude petroleum microcrystalline residues are treated with 0.3% to 2.0% or 3 to 6 parts per thousand of anhydrous aluminum chloride in molten condition at 110° C. and preferably dry or less desirably slightly moist hydrogen chloride is introduced for a period of 6 to 7 hours or an atmosphere thereof is otherwise maintained.

If no hydrochloric acid gas is used, a higher percentage of aluminum chloride, up to 20% may be employed.

After several hours' treatment, black asphaltic polymerization products settle to the bottom of the molten material. This sludge material, upon separation, is found to be insoluble in gasoline, but quite soluble in benzene or toluene. In dry cold condition, it is a hard brittle mass.

The aluminum treated microcrystalline residue—which may be termed residue A—left after removal of the sludge by settling, is filtered in order to remove floating insoluble material, including any free aluminum chloride, and the filtrate will be of very light color, approximating light lemon of #2 rating.

This microcrystalline residue shows different fracture and has lower penetration than the starting microcrystalline residue material.

It also has a shorter setting time and does not show tackiness in mixtures with petrolatums or mineral oils. It lowers the penetration of such mixtures 10 to 15 points and raises the softening point of such mixtures 5° C. to 10° C. as compared with mixtures of the same proportions with the untreated microcrystalline residue.

This treated microcrystalline residue may be submitted to vacuum distillation at 1 to 10 millimeters pressure and at temperatures up to 385° C. Distillation may be started at a temperature of 240° C. and gradually increased up to 385° C.

Most of the distillate distilled over between 325° C. and 385° C. The distillate constituted 55% to 60% of original microcrystalline residue and had distinct crystalline form as compared to original microcrystalline residue and may be termed residue B. It had an oil content of 17% determined by solvent extraction and a penetration value of 25. When oil free it had a sharp melting point of 85° C.

The oil free distillate has a sharp setting point, has slip and it is not tacky; and oil or solvent mixtures including this distillate are non-tacky and show hard brittle characteristics rather than plastic characteristics.

The residue left behind from the vacuum distillation has a melting point of 95° C. against 92° C. for the untreated residue, a penetration value of 7 to 10 and is completely oil free when tested by solvent extraction methods. The residue left from vacuum distillation may be termed residue D.

The vacuum distillate may be treated with solvents such as the ketone in order to remove oil therefrom and to render it harder and give it higher tensile strength, reducing its brittleness.

Penetration values mentioned above and those hereinafter described in this specification refer to penetrations determined according to the A. S. T. M. method D-5-25, published by the American Society for Testing Materials. The conditions under which all penetration values were determined were with a load of 100 grams for a period of five seconds at a temperature of 25° C. and the units of penetration indicate hundredths of a centimeter. These are the standard conditions set forth in the above designated A. S. T. M. method.

When original microcrystalline residue (or if desired after solvent extraction) is treated at high temperatures of 200° C. to 400° C. with diatomaceous earth, kieselguhr, and/or fuller's earth (e. g., the material known on the market as Filtrol) in amounts of 10% to 40% and then vacuum distilled at 1 to 5 millimeters and up to 385° C., about 25% to 30% will distill over and it will be an oily material with a melting point of 76° C. to 80° C. when oil is removed by solvent extraction.

The residue left from this distillation has melting point of 92° C., the same as the starting material.

If desired, the vacuum distillation may be omitted and after filtration the microcrystalline residue may be blown with air or mixtures of air and oxygen, in the presence of a heavy metal soap, such as manganese, lead or aluminum stearates or palmitates, at temperatures between 120° C. and 180° C., preferably at 150° C. to 160° C. Usually, ¼% to 2% of manganese stearate is quite satisfactorily included as a catalyst. If desired, lithium stearate may be employed, as may salts of metals which will form insoluble soaps such as chlorides, sulphates and nitrates of lithium, manganese, nickel, cobalt and lead.

Superatmospheric pressures may be employed and the process of blowing may be continued for 5 to 25 hours. The temperature may be varied during the process. For example, the temperature may be decreased from 180° C. down to 120° C.

Desirably, there is included small amounts (½% to 5%) of halogenated waxes, such as chlorinated paraffin or other non-volatile high melting point chlorinated aliphatic or aromatic hydrocarbons.

There is also desirably included substantial amounts (5% to 50%) of a polymerized unsaturated hydrocarbon, such as polymers of ethylene, propylene, vinyl compounds, styrene, and butadiene, preferably having molecular weights over 5,000. These polymers may be added before and/or during the blowing operation.

Small amounts (¼% to 5%) of aluminum halid, for example, aluminum chloride or fluoride may be included in the molten microcrystalline residue during the blowing operation.

As another specific example, an acid purified, solvent extracted Texas petroleum microcrystalline residue is blown with air or oxygen at 155° C. to 165° C. for seven hours. Desirably, 5% to 15% of high molecular weight alkylene polymer having a molecular weight in excess of 10,000 may be included. Polyethylene or polystyrene may be included, and ½ may be added before the blowing starting and the other ½ when it is partly completed.

As catalysts there may be included highly chlorinated hydrocarbons, such as ½% to 1% of chlorinated paraffin and ½% to 1% of heavy metal soaps, such as manganese stearate or lead palmitate, with or without 0.3% to 1% aluminum chloride or aluminum fluoride.

The blown microcrystalline residue has unusual monothixotropic properties and produces very good flow in mixtures of pigments, such as carbon black, in dispersions of said pigments in natural or synthetic waxes. This blown residue may be termed residue C.

For example, 5% of blown microcrystalline residue may be used in place of 20% carnauba wax in carbon paper inks with resultant perfect dispersion of the carbon black and free flow of the ink in molten condition and when applied to the paper carrier.

It may be used in asphalt and bitumen mixtures to enhance flow when molten and to disperse pigments therein and enhance spreadability of such compounds on surfaces, such as paper.

It may be readily mixed with resin compositions used for coating or laminating paper, textiles or other materials.

It may also be included in wax polishes (shoe, furniture or floor) or sizings.

If desired, the microcrystalline residue may be partly chlorinated or halogenated, preferably before being blown or even before the treatment with aluminum chloride in hydrogen chloride. For example, hydrogen chloride containing chlorine might be bubbled through the molten mixture or chlorine may be included in the air which is blown through the molten mixture.

The microcrystalline residue may also be treated with nitric acid or chromic acid or even with hydrogen peroxide before, after or during the various steps in the above procedures.

The microcrystalline residue also may be partly blown with air, then subjected to treatment with aluminum chloride and hydrogen chloride and finally, if desired, it may then be further blown.

If moisture is present in any of the above treatments, it should be present in amounts from ¼% to 1½%.

The microcrystalline residue halized or chlorized as above and/or vacuum distilled as above and/or blown as above may utilized in many waxy compositions, particularly to replace or extend natural waxes such as carnauba wax.

Generally, either the treatment with aluminum chloride or the blowing of air or oxygen in the presence of a chlorinated compound and a high molecular polymer may be sufficient to enable the microcrystalline material to be most readily employed in wax containing compositions, but it has been found most desirable to utilize both treatments to produce a dispersing agent for use in carbon black compositions.

It is particularly useful when blown, as a dispersing agent for carbon black in carbon paper-ink compositions.

As typical carbon black compositions using the blown microcrystalline residues:

*Example I*

|   | Per cent by weight |
|---|---|
| Carbon black | 14 |
| Blown microcrystalline residue (residue C) | 5 |
| Ink oil | 43 |
| Microcrystalline vacuum distillate (residue B) | 38 |

*Example II*

|   | Per cent by weight |
|---|---|
| Blown microcrystalline residue | 5 |
| Carnauba wax | 10 |
| Ink oil | 43 |
| Carbon black | 14 |
| Microcrystalline vacuum distillate (residue B) | 18 |
| Microcrystalline residue A | 10 |

The ink oil is a brown or amber mineral oil.

Residues A, B, C and D are useful quite widely in wax containing compositions to replace the wax in whole or part and particularly to replace or extend carnauba wax.

To give an outline of the above preferred procedures:

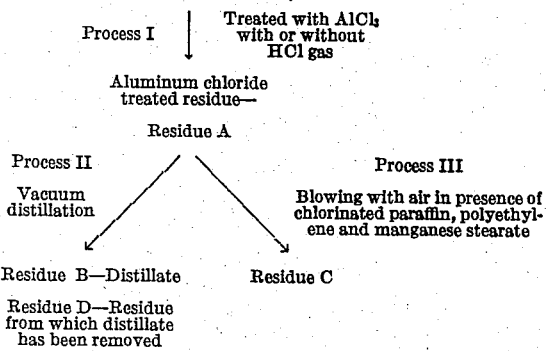

Although Processes II and III alone may give desired enhancement and modification of the residue, they desirably are always preceded by Process I. Less desirably Processes II and III may be successive in either order rather than alternative, but this does not result in the best product.

In general, it will be understood that the details herein described and illustrated may be modified by those skilled in the art without departing from the spirit and scope of the invention as expressed in the appended claims. It is therefore intended that these details be interpreted as illustrative and not in a limiting sense.

What is claimed is:

1. A process of improving petroleum microcrystalline residues which comprises treating them with aluminum chloride in the presence of hydrogen chloride and then blowing with air in the presence of a chlorinated hydrocarbon.

2. A process of polymerizing Texas petroleum microcrystalline residues which comprises treating them with aluminum chloride and then blowing the resultant material in molten condition at a temperature of 100° C. to 175° C. in the presence of a polymerized non-volatile unsaturated hydrocarbon, a non-volatile halogenated hydrocarbon, and a heavy metal fatty acid salt.

3. A process of polymerizing high melting point Texas petroleum microcrystalline residues which comprises treating with an aluminum halid in the presence of hydrochloric acid gas and then blowing the resultant material in molten condition at a temperature of 100° C. to 175° C. in the presence of 10% of a polyethylene having a molecular weight in excess of 10,000, ½% to 1% of highly chlorinated paraffin and ½% to 1% of manganese stearate for 1 to 10 hours.

4. A process of enhancing high melting point petroleum microcrystalline residues which comprises treating the same in molten condition with aluminum chloride, and then with air in the presence of a small amount of polyethylene.

5. A process of enhancing high melting point petroleum microcrystalline residues which comprises treating the same in molten condition with aluminum chloride, and then with air in the presence of a small amount of highly polymerized unsaturated hydrocarbon.

6. A process of enhancing high melting point petroleum microcrystalline residues which comprises treating the same in molten condition with aluminum chloride, and then with air in the presence of chlorinated paraffin.

7. A process of enhancing high melting point petroleum microcrystalline residues which comprises treating the same in molten condition with aluminum chloride, and then with air in the presence of halogenated paraffin.

8. A process of modifying petroleum microcrystalline residues which comprises treating them with an aluminum halid and then blowing with air and adding polyethylene during the blowing.

9. A process of modifying petroleum microcrystalline residues which comprises treating them with an aluminum halid and then blowing with air and adding polyethylene both before and during the blowing.

10. A process of improving petroleum microcrystalline residues which comprises treating said residue at a temperature of 100–175° C. with oxygen in the presence of a non-volatile chlorinated hydrocarbon.

11. A process of improving petroleum microcrystalline residues which comprises treating said residue with oxygen in a molten condition at a temperature of 100° C. to 175° C. in the presence of a polymerized non-volatile unsaturated hydrocarbon, a non-volatile halogenated hydrocarbon and a heavy metal fatty acid salt.

12. A process of improving high melting point petroleum microcrystalline residues which comprises treating said residue with oxygen in the presence of a small amount of polyethylene.

13. A process of improving high melting point petroleum microcrystalline residues at a temperature of 100–175° C. which comprises treating said residue with oxygen in the presence of a non-volatile chlorinated paraffin.

14. As a new material, wax products resulting from the treatment, with oxygen, at a temperature of 100–175° C. of mixtures of a petroleum microcrystalline residue and non-volatile chlorinated hydrocarbon.

15. As a new material, wax products resulting from the treatment, with oxygen, of mixtures of petroleum microcrystalline residues and polyethylene.

JOHN J. FISH.

REFERENCES CITED

The following references are of record in the file of this patent:

UNITED STATES PATENTS

| Number | Name | Date |
|---|---|---|
| 1,277,092 | McAfee | Aug. 27, 1918 |
| 1,740,125 | Sullivan | Dec. 17, 1929 |
| 2,014,629 | Musselman | Sept. 17, 1935 |
| 2,119,940 | Carr et al. | June 7, 1938 |
| 2,158,672 | Carr et al. | May 16, 1939 |
| 2,179,208 | Burk et al. | Nov. 7, 1939 |
| 2,179,988 | Whitacre | Nov. 14, 1939 |
| 2,329,785 | Pool | Sept. 21, 1943 |
| 2,337,336 | McCluer et al. | Dec. 21, 1943 |

FOREIGN PATENTS

| Number | Country | Date |
|---|---|---|
| 394,414 | Great Britain | June 29, 1933 |